(12) United States Patent
Mao et al.

(10) Patent No.: US 9,662,974 B2
(45) Date of Patent: May 30, 2017

(54) TORQUE CONTROL FOR VEHICLES WITH INDEPENDENT FRONT AND REAR PROPULSION SYSTEMS

(71) Applicant: GM GLOBAL TECHNOLOGY OPERATIONS LLC, Detroit, MI (US)

(72) Inventors: Xiaofeng Mao, Novi, MI (US); Thomas A. Klingler, Lake Orion, MI (US); Eric E. Krueger, Chelsea, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 14/620,018

(22) Filed: Feb. 11, 2015

(65) Prior Publication Data

US 2016/0229291 A1    Aug. 11, 2016

(51) Int. Cl.
| | | |
|---|---|---|
| *G06F 7/00* | (2006.01) | |
| *B60K 23/08* | (2006.01) | |
| *B60W 30/18* | (2012.01) | |
| *B60K 1/00* | (2006.01) | |
| *B60K 17/356* | (2006.01) | |

(52) U.S. Cl.
CPC ............ *B60K 23/0808* (2013.01); *B60K 1/00* (2013.01); *B60K 17/356* (2013.01); *B60W 30/18* (2013.01); *B60K 2001/001* (2013.01); *B60K 2023/0825* (2013.01); *B60K 2023/0833* (2013.01); *B60W 2720/30* (2013.01)

(58) Field of Classification Search
CPC ... B60W 30/18; B60W 2720/30; B60K 17/34; B60K 23/0808
See application file for complete search history.

(56) References Cited

U.S. PATENT DOCUMENTS

| | | | |
|---|---|---|---|
| 4,874,059 A * | 10/1989 | Kasegawa | B60K 23/0808 180/197 |
| 8,924,114 B2 * | 12/2014 | Matsuno | B60W 30/045 701/69 |
| 2012/0109414 A1 * | 5/2012 | Kumabe | B60W 50/045 701/1 |
| 2014/0297141 A1 * | 10/2014 | Nihanda | B60K 23/0808 701/58 |
| 2014/0297150 A1 * | 10/2014 | Ohyagi | B60K 17/3505 701/89 |

* cited by examiner

*Primary Examiner* — David J Hlavka
(74) *Attorney, Agent, or Firm* — Lorenz & Kopf, LLP

(57) ABSTRACT

Methods and systems for controlling torque for a front axle and a rear axle of a vehicle with independent front and rear propulsion systems are provided. A data unit is configured to obtain data for one or more parameters of a vehicle while the vehicle is being driven. A processor is coupled to the data unit, and is configured to provide torque to at least facilitate providing torque the front axle and the rear axle independently based on the one or more parameters.

16 Claims, 3 Drawing Sheets

US 9,662,974 B2

TORQUE CONTROL FOR VEHICLES WITH INDEPENDENT FRONT AND REAR PROPULSION SYSTEMS

TECHNICAL FIELD

The present disclosure generally relates to vehicles, and more particularly relates to methods and systems for controlling torque for multiple axles of vehicles.

BACKGROUND

Many vehicles today control torque for axles of the vehicle, for example by reducing or increasing torque to help compensate for vehicle understeer or vehicle oversteer and/or in various other situations. However, such existing techniques may sacrifice overall propulsion for the vehicle.

Accordingly, it is desirable to provide techniques for controlling torque for axles of vehicle, for example that maintain overall propulsion for the vehicle. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining data for one or more parameters of a vehicle while the vehicle is being driven, the vehicle having a front axle and a rear axle, and providing torque to the front axle and the rear axle independently based on the one or more parameters.

In accordance with an exemplary embodiment, a system is provided. The system comprises a data unit and a processor. The data unit is configured to obtain data for one or more parameters of a vehicle while the vehicle is being driven. The vehicle has a front axle and a rear axle. The processor is coupled to the data unit, and is configured to provide torque, or at least facilitate providing torque, to the front axle and the rear axle independently based on the one or more parameters.

In accordance with a further exemplary embodiment, a vehicle is provided. The vehicle comprises a body, a front axle, a rear axle, a data unit, and a processor. The front axle and rear axle are disposed within the body. The data unit is configured to obtain data for one or more vehicle parameters while the vehicle is being driven. The processor is disposed within the body, and is coupled to the data unit. The processor is configured to provide torque, or at least facilitate providing torque, to the front axle and the rear axle independently based on the one or more parameters.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
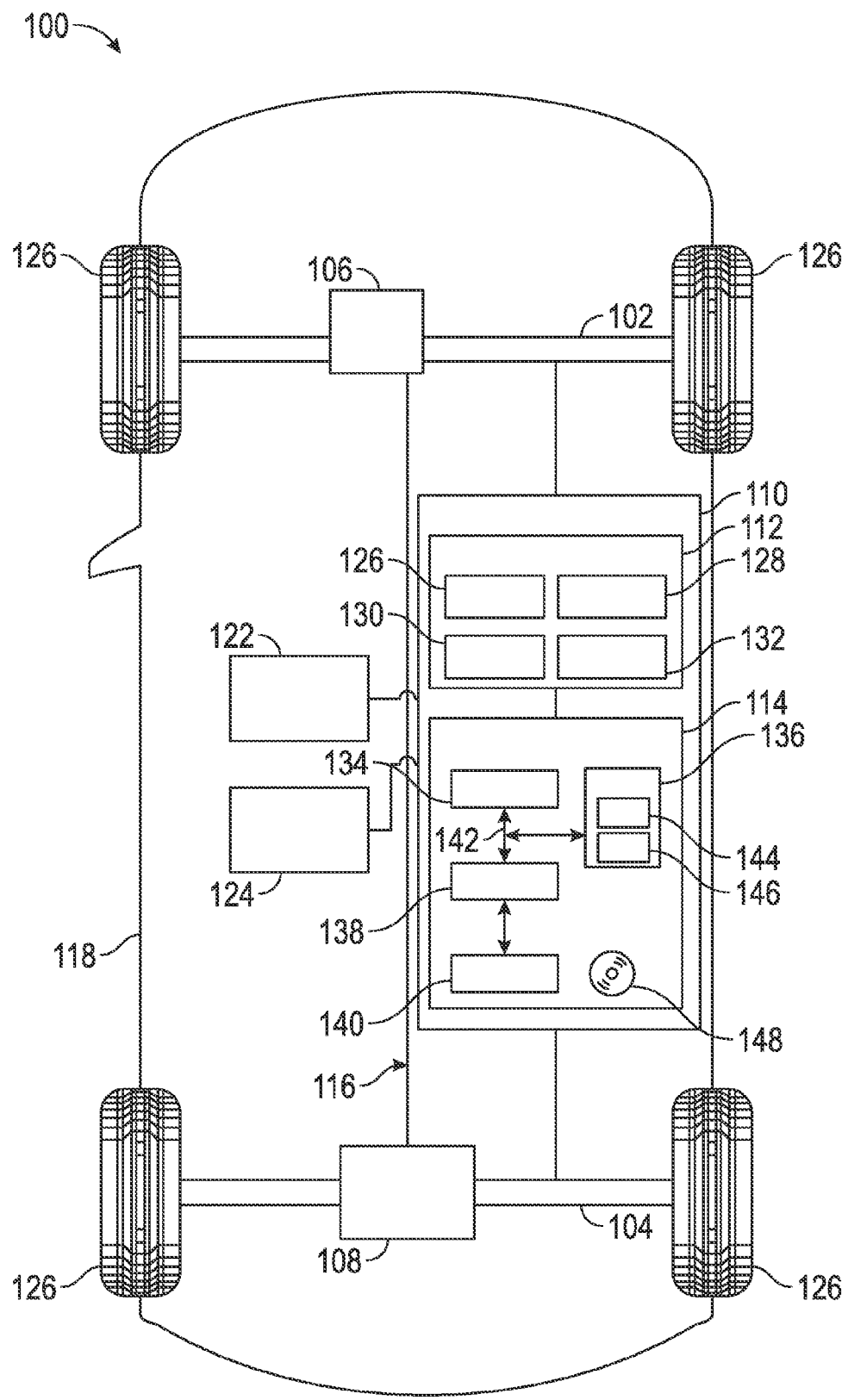
FIG. 1 is a functional block diagram of a vehicle that includes a front axle, a rear axle, a front propulsion system, a rear propulsion system, and a control system that controls torque independently for the front and rear axles using the front and rear propulsion systems.

FIG. 1 illustrates a vehicle 100, or automobile, according to an exemplary embodiment. As described in greater detail further below, the vehicle 100 includes a front axle 102, a rear axle 104 along with a front propulsion system 106, a rear propulsion system 108, and a control system 110 that controls torque independently for the front and rear axles 102, 104 using the front and rear propulsion systems 106, 108. In certain embodiments, the control system 110 comprises, is part of, and/or is coupled to one or more engine control systems (ECS) and/or safety systems for the vehicle 100 (such as for automatic braking, braking assist, steering assist, traction control, electronic stability control, lane departure warning, lane change awareness, and/or for one or more other active safety features), among other possible systems. As discussed further below, the control system 110 includes a sensor array 112 and a controller 114 that are used for controlling torque for the front and rear axles 102, 104.

As depicted in FIG. 1, the vehicle 100 also includes a chassis 116, a body 118, a plurality of wheels 126, a steering system 122, and a braking system 124. The body 118 is arranged on the chassis 116 and substantially encloses the other components of the vehicle 100. The body 118 and the chassis 116 may jointly form a frame. The wheels 126 are each rotationally coupled to the chassis 116 near a respective corner of the body 118. In various embodiments the vehicle 100 may differ from that depicted in FIG. 1. For example, while four wheels 126 are depicted in FIG. 1, in certain embodiments the number of wheels 126 may vary.

In the exemplary embodiment illustrated in FIG. 1, the front propulsion system 106 and the rear propulsion system 108 are both mounted on the chassis 116 that drives the wheels 126. The front propulsion system 106 moves the front axle 102 based on instructions provided by the control system 110, and the rear propulsion system 108 moves the rear axle 104 based on instructions provided by the control system 110, independent of one another. In various embodiments, the front and rear propulsion systems may comprise the same type or different types of propulsion systems, which may include, by way of example, batteries, electric motors, gas combustion engines, fuel cell engines, and/or various other types of propulsion systems.

The steering system 122 is mounted on the chassis 116, and controls steering of the wheels 126. The steering system 122 includes a steering wheel and a steering column (not depicted). The steering wheel receives inputs from a driver of the vehicle 100. The steering column results in desired steering angles for the wheels 126 via drive shafts of the axles 102, 104 based on the inputs from the driver.

The braking system 124 is mounted on the chassis 116, and provides braking for the vehicle 100. The braking system 124 receives inputs from the driver via a brake pedal (not depicted), and provides appropriate braking via brake units (also not depicted). The driver also provides inputs via an accelerator pedal (not depicted) as to a desired velocity or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver.

The control system 110 is mounted on the chassis 116. As discussed above, the control system 110 controls torque to the front and rear axles 102, 104 via the front and rear propulsion systems 106, 108, respectively, and includes a sensor array 112 and a controller 114.

The sensor array 112 includes various sensors (also referred to herein as sensor units) that are utilized to calculate a velocity of the vehicle using different techniques. In the depicted embodiments, the sensor array 112 includes one or more wheel sensors 126, steering sensors 128, and yaw sensors 130. In one embodiment, the wheel sensors 126 measure wheel speeds and angles of one or more of the wheels 126 of the vehicle 100. Also in one embodiment, the steering sensors 128 measure position and/or movement of a steering wheel of the steering system 122 of the vehicle 100. In addition, in one embodiment, the yaw sensors 130 measure a yaw rate of the vehicle 100. The measurements and information from the various sensors of the sensor array 112 are provided to the controller 114 for processing. In certain embodiments, the sensor array 112 may include one or more other sensors 132 such as, by way of example, one or more accelerometers (e.g., longitudinal and lateral accelerometers) and/or global positioning system (GPS) sensors and/or other sensors.

Figure 2:
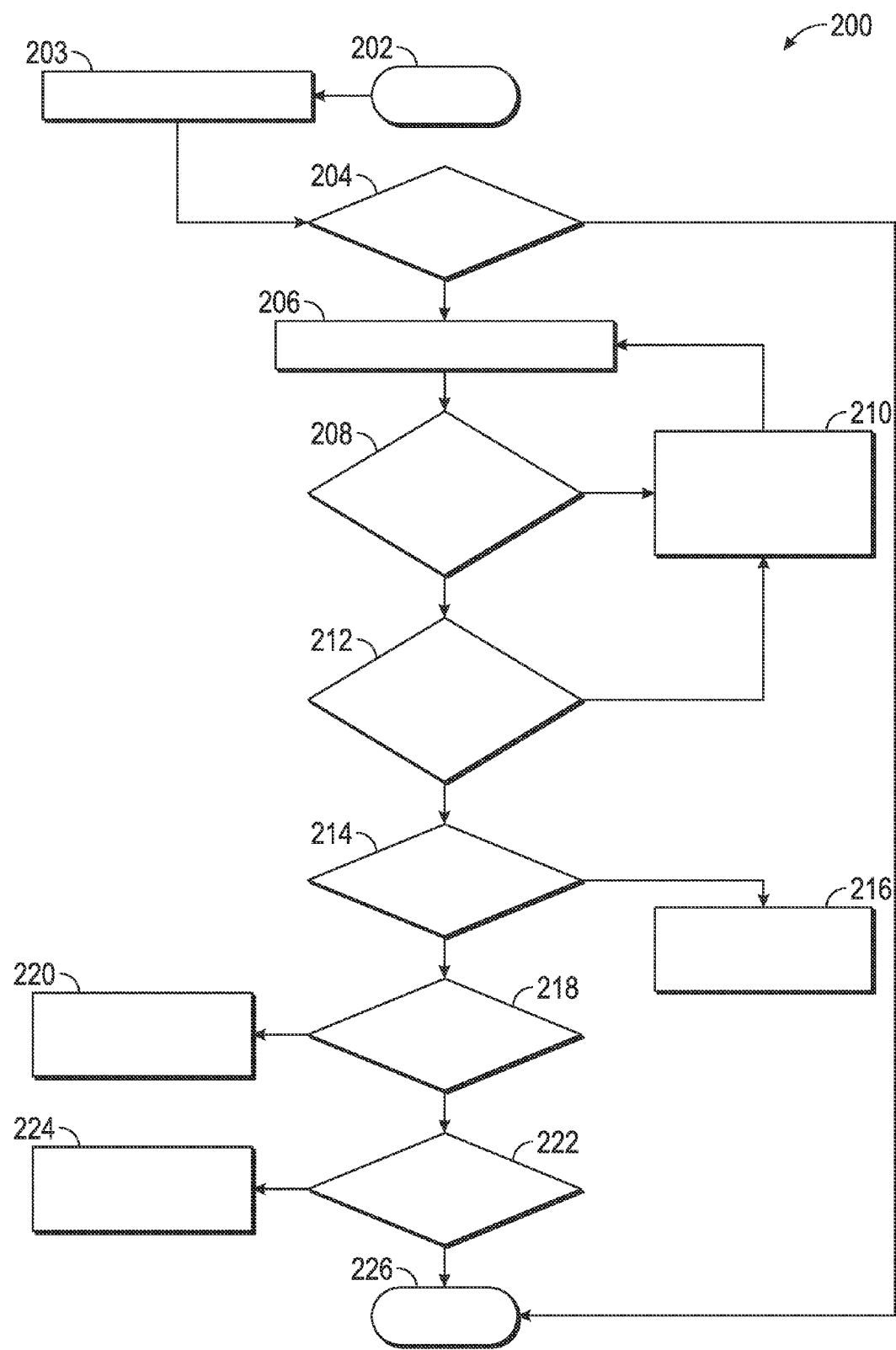
FIG. 2 is a flowchart of a process for providing torque for a vehicle, and that can be implemented in connection with the vehicle, including the control system, the front propulsion system, and the rear propulsion system of FIG. 2.
Figure 3:
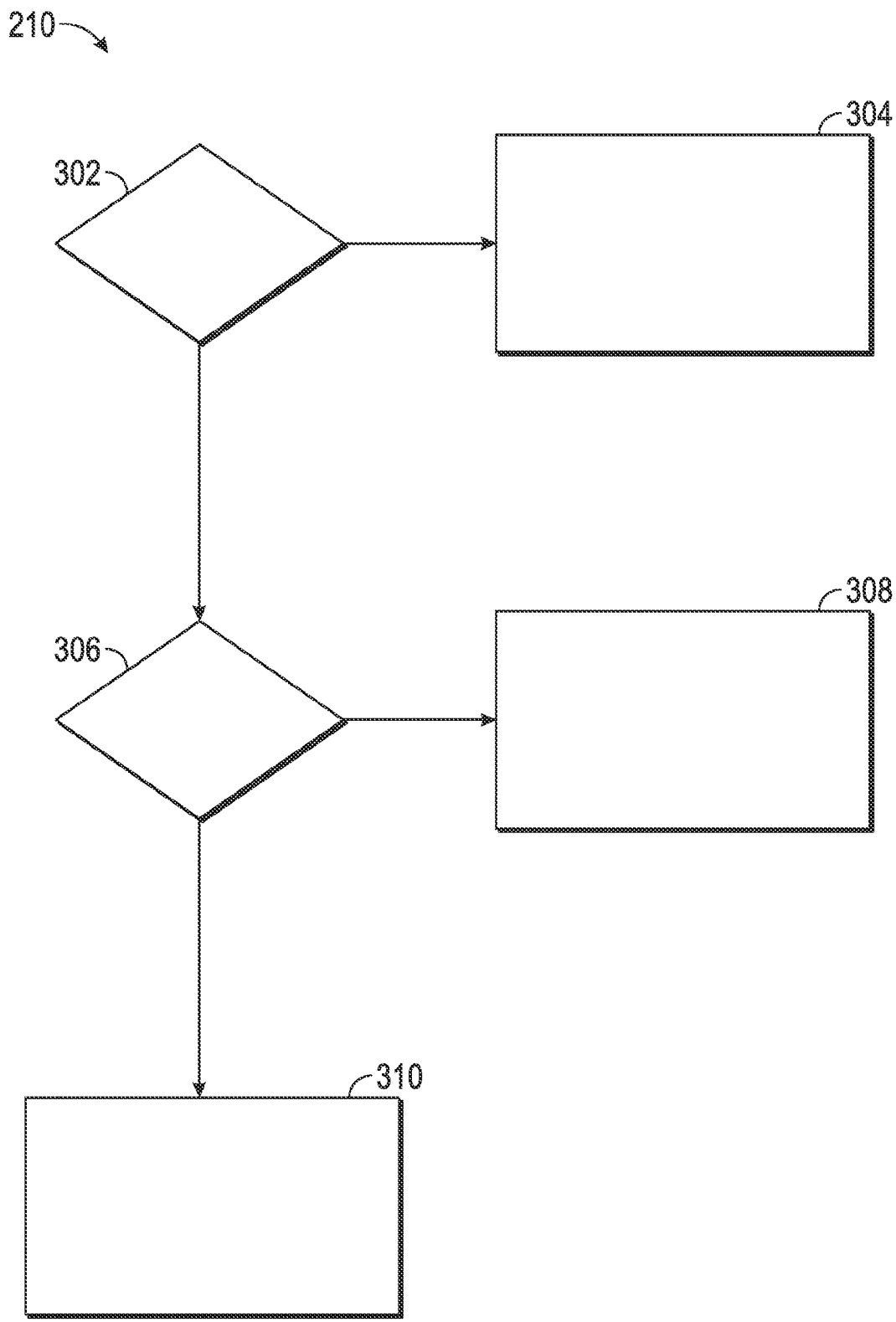
FIG. 3 is a flowchart of a sub-process for the process of FIG. 2, namely, the sub-process of reducing torque on the front and rear axles under certain conditions, in accordance with an exemplary embodiment.

The controller 114 is coupled to the sensor array 112. The controller 114 utilizes the various measurements and information from the sensors array 112 for providing torque independently for the front and rear axles 102, 104, using the front and rear propulsion system 106, 108, using various techniques. The controller 114, along with the sensor array 112, also provide additional functions, such as those discussed further below in connection with the flowcharts of the process 200 as depicted in FIGS. 2 and 3 and discussed further below.

As depicted in FIG. 1, the controller 114 comprises a computer system. In certain embodiments, the controller 114 may also include one or more of the sensors of the sensor array 112, one or more other devices and/or systems, and/or components thereof. In addition, it will be appreciated that the controller 114 may otherwise differ from the embodiment depicted in FIG. 1. For example, the controller 114 may be coupled to or may otherwise utilize one or more remote computer systems and/or other control systems, such as an electronic control system of the vehicle 100.

In the depicted embodiment, the computer system of the controller 114 includes a processor 134, a memory 136, an interface 138, a storage device 140, and a bus 142. The processor 134 performs the computation and control functions of the controller 114, and may comprise any type of processor or multiple processors, single integrated circuits such as a microprocessor, or any suitable number of integrated circuit devices and/or circuit boards working in cooperation to accomplish the functions of a processing unit. During operation, the processor 134 executes one or more programs 144 contained within the memory 136 and, as such, controls the general operation of the controller 114 and the computer system of the controller 114, generally in executing the processes described herein, such as the process 200 described further below in connection with FIGS. 2 and 3.

The memory 136 can be any type of suitable memory. For example, the memory 136 may include various types of dynamic random access memory (DRAM) such as SDRAM, the various types of static RAM (SRAM), and the various types of non-volatile memory (PROM, EPROM, and flash). In certain examples, the memory 136 is located on and/or co-located on the same computer chip as the processor 134. In the depicted embodiment, the memory 136 stores the above-referenced program 144 along with one or more stored values 146 (e.g., any stored dynamic models, thresholds, and/or other values) for use in making the determinations.

The bus 142 serves to transmit programs, data, status and other information or signals between the various components of the computer system of the controller 114. The interface 138 allows communication to the computer system of the controller 114, for example from a system driver and/or another computer system, and can be implemented using any suitable method and apparatus. In one embodiment, the interface 138 obtains the various data from the sensors of the sensor array 112. The interface 138 can include one or more network interfaces to communicate with other systems or components. The interface 138 may also include one or more network interfaces to communicate with technicians, and/or one or more storage interfaces to connect to storage apparatuses, such as the storage device 140.

The storage device 140 can be any suitable type of storage apparatus, including direct access storage devices such as hard disk drives, flash systems, floppy disk drives and optical disk drives. In one exemplary embodiment, the storage device 140 comprises a program product from which memory 136 can receive a program 144 that executes one or more embodiments of one or more processes of the present disclosure, such as the steps of the process 200 (and any sub-processes thereof) described further below in connection with FIGS. 2 and 3. In another exemplary embodiment, the program product may be directly stored in and/or otherwise accessed by the memory 136 and/or a disk (e.g., disk 148), such as that referenced below.

The bus 142 can be any suitable physical or logical means of connecting computer systems and components. This includes, but is not limited to, direct hard-wired connections, fiber optics, infrared and wireless bus technologies. During operation, the program 144 is stored in the memory 136 and executed by the processor 134.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 134) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 114 may also otherwise differ from the embodiment depicted in FIG. 1, for example in that the computer system of the controller 114 may be coupled to or may otherwise utilize one or more remote computer systems and/or other control systems.

While the control system 110, the sensory array 112, and the controller 114 are depicted as being part of the same system, it will be appreciated that in certain embodiments these features may comprise two or more systems. In addition, in various embodiments the control system 110 may comprise all or part of, and/or may be coupled to, various other vehicle devices and systems, such as, among others, propulsion systems 106, 108, steering system 122, braking system 124, and/or an engine control system for the vehicle 100.

FIG. 2 is a flowchart of a process 200 for controlling front and rear axles of a vehicle, in accordance with an exemplary embodiment. The process 200 can be implemented in connection with the vehicle 100, including the control system 110, of FIG. 1, in accordance with an exemplary embodiment.

As depicted in FIG. 2, the process 200 is initiated at step 202. Once the process is initiated, data is obtained (step 203). In certain embodiments, the data includes measured and/or calculated parameter values that include a vehicle velocity as well as an actual slip angle (e.g., an estimated or actual slip angle), a desired slip angle, an actual yaw rate (e.g., an estimated or actual yaw rate), and a desired yaw rate for the vehicle. As referred to herein, (i) "slip angle" refers to angular difference between a direction in which the vehicle is pointed and a direction of travel of the vehicle; (ii) "actual slip angle" refers to an estimated, calculated, measured and/or actual slip angle for the vehicle (in certain embodiments, the actual slip angle is estimated using an on-board algorithm based on information from inertial measurement unit (IMU) sensors, vehicle motion, and driver inputs—in one such embodiment, the slip angle is estimated, nominally, by measuring a slip angle rate over time and integrating the slip angle rate); (iii) "desired slip angle" refers to a driver's intention for the slip angle for the vehicle (e.g. as determined a function of the vehicle suspension geometry and the vehicle velocity); (iv) "yaw rate" refers to an angular rotation of the vehicle over time; (v) "actual yaw rate" refers to a measured, calculated, and/or actual yaw rate for the vehicle (for example, as measured or determined using yaw rate sensors); and (vi) "desired yaw rate" refers to a driver's intention for the yaw rate for the vehicle (e.g. as determined as a function of a driver's engagement of a steering wheel of the vehicle and vehicle velocity).

In certain embodiments, background data for determining these parameter values is obtained in step 203. In one embodiment, these values are obtained and/or determined by a data unit of the vehicle 100 of FIG. 1, such as the various sensors of the sensor array 112 of FIG. 1, and are provided to the controller 114 of FIG. 1 (and, specifically, the processor 134 thereof) for processing. In one exemplary embodiment, the vehicle velocity is obtained from wheel speed measurements from the wheel sensors 126 of FIG. 1, the actual slip angle is estimated using an on-board algorithm based on information from inertial measurement unit (IMU) sensors, vehicle motion, and driver inputs, the actual yaw rate is determined from the yaw sensors 130 of FIG. 1, the desired slip angle is determined as a function of the vehicle suspension geometry, driver inputs, and the vehicle velocity, and the desired yaw rate is determined from the vehicle velocity and steering sensors 128 of FIG. 1 and vehicle velocity.

A determination is made whether a vehicle velocity is greater than a first predetermined threshold (step 204). In one embodiment, the vehicle velocity is obtained from step 203. In addition, in one embodiment, the first predetermined threshold is stored in the memory 136 of FIG. 1 as one of the stored values 146 thereof. In one embodiment, this threshold may be approximately equal to five miles per hour (5 mph). However, this may vary in other embodiments. Also in one embodiment, the determination of step 204 is made by the processor 134 of FIG. 1.

In certain embodiments, additional calculations are performed from the data of step 203 (step 206). Specifically, in one embodiment, the actual slip angle, desired slip angle, and desired yaw rate are calculated in step 206, to the extent that these values have not already been determined in step 203. Also in one embodiment, the calculations of step 206 are performed by the processor 134 of FIG. 1.

Determinations are as made as to whether (a) a rate of change of the actual slip angle over time is greater than or equal to a second predetermined threshold; and (b) the actual slip angle is greater than or equal to the desired slip angle (step 208). In one embodiment, the rate of change of the slip angle over time is measured via one or more sensors. Also in one embodiment, the second predetermined threshold is stored in the memory 136 of FIG. 1 as one of the stored values 146 thereof. In one embodiment, the threshold may approximately be equal to two or three degrees per second (2 or 3 deg/sec); however, this may vary in other embodiments. Also in one embodiment, these determinations are made by the processor 134 of FIG. 1.

If it is determined that both conditions of step 208 are satisfied; namely, (a) the rate of change of the actual slip angle over time is greater than or equal to the second predetermined threshold; and (b) the actual slip angle is greater than or equal to the desired slip angle, then the front axle torque and the rear axle torque are both reduced, based on the desired yaw rate and the measured rate (step 210). In one embodiment, the torque adjustments are made based on instructions provided by the processor 134 of FIG. 1 to the front and rear propulsion systems 106, 108 of FIG. 1. The process then returns to the above-described step 206 in a new iteration.

With reference to FIG. 3, a flowchart is provided for step 210 (or sub-process 210) of the process 200, in accordance with an exemplary embodiment. In accordance with this embodiment, a determination is made as to whether a difference between the absolute value of the desired yaw rate minus the absolute value of the actual yaw rate is greater than a third predetermined threshold (step 302). In one embodiment, the predetermined threshold of step 302 is stored in the memory 136 of FIG. 1 as one of the stored values 146 thereof. In one embodiment, the threshold may approximately be equal to five degrees per second (5 deg/sec); however, this may vary in other embodiments. Also in one embodiment, the determination of step 302 is made by the processor 134 of FIG. 1.

If it is determined that the difference between the absolute value of the desired yaw rate minus the absolute value of the actual yaw rate is greater than the predetermined threshold of step 302, then torque is reduced for both the front and rear axles such that the reduction in torque for the front axle is greater than the reduction in torque for the rear axle (step 304). In one embodiment, the amount of torque to be reduced on both axles is determined in a dynamic manner rather than a fixed calibration number. In one such embodiment, this may be determined by a look-up table or a proportional integral derivative (PID) controller based on actual slip angle, desired slip angle, actual yaw rate, desired yaw rate, vehicle velocity, other vehicle motion status, or the like. In one embodiment, the torque adjustments are made based on instructions provided by the processor 134 of FIG. 1 to the front and rear propulsion systems 106, 108 of FIG. 1.

Conversely, if it is determined in step 302 that the difference between the absolute value of the desired yaw rate minus the absolute value of the actual yaw rate is less than or equal to the predetermined threshold of step 302, then a determination is made as to whether a difference between the absolute value of the actual yaw rate minus the absolute value of the desired yaw rate is greater than a fourth predetermined threshold (step 306). In one embodiment, the predetermined threshold of step 306 is stored in the memory 136 of FIG. 1 as one of the stored values 146 thereof. In one embodiment, the threshold of step 306 is less than the threshold of step 302. In one such embodiment, the threshold of step 306 is approximately be equal to three degrees per second (3 deg/sec); however, this may vary in other embodiments. Also in one embodiment, the determination of step 306 is made by the processor 134 of FIG. 1.

If it is determined that the difference between the absolute value of the actual yaw rate minus the absolute value of the desired yaw rate is greater than the predetermined threshold of step 306, then torque is reduced to both the front and rear axles such that the reduction in torque for the rear axle is greater than the reduction in torque for the front axle (step 308). In one embodiment, the amount of torque to be reduced on both axles is determined in a dynamic manner rather than a fixed calibration number. In one such embodiment, this may be determined by a look-up table or a proportional integral derivative (PID) controller based on actual slip actual angle, desired slip angle, actual yaw rate, desired yaw rate, vehicle velocity, other vehicle motion status, or the like. In one embodiment, the torque adjustments are made based on instructions provided by the processor 134 of FIG. 1 to the front and rear propulsion systems 106, 108 of FIG. 1. Also in one embodiment in which the values are calculated by a PID, as the error term decreases the command to modify torque also decreases. In one embodiment, the torque adjustments are made based on instructions provided by the processor 134 of FIG. 1 to the front and rear propulsion systems 106, 108 of FIG. 1.

Conversely, if it is determined in step 306 that the difference between the absolute value of the actual yaw rate minus the absolute value of the desired yaw rate is less than or equal to the predetermined threshold of step 306, then torque is reduced to both the front and rear axles such that the reduction in torque for the rear axle is equal to the reduction in torque for the front axle (step 310).

Returning to step 208 of FIG. 2, if it is determined in step 208 that one or both conditions of step 208 are not satisfied; namely, that (a) the rate of change of the actual slip angle over time is less than the second predetermined threshold of step 208 and/or (b) the actual slip angle is less than the desired slip angle, then a further determination is made as to whether the rate of change of the actual slip angle over time is less than or equal to a fifth threshold; and (b) the actual slip angle is less than or equal to the desired slip angle (step 212). In one embodiment, the predetermined threshold of step 212 is stored in the memory 136 of FIG. 1 as one of the stored values 146 thereof. In one embodiment, this threshold may be approximately equal to two or three degrees per second (2 or 3 deg/sec). However, this may vary in other embodiments. Also in one embodiment, the determinations of step 212 are made by the processor 134 of FIG. 1.

If it is determined that both conditions of step 212 are satisfied; namely, (a) the rate of change of the actual slip angle over time is less than or equal to the predetermined threshold of step 212; and (b) the actual slip angle is less than or equal to the desired slip angle, then the process proceeds to the above-described step 210. Conversely, if is determined that either or both of these conditions of step 212 are not satisfied, then the process proceeds instead to step 214, described below.

During step 214, a determination is made as to whether a product of the desired yaw rate multiplied by the actual yaw rate is greater than or equal to zero. Alternatively stated, in one embodiment the determination of step 214 comprises a determination as to whether the desired yaw rate and the actual yaw rate have the same sign (i.e., positive or negative). In one embodiment, this determination is made by the processor 134 of FIG. 1.

If it is determined in step 214 that the desired yaw rate and the actual yaw rate do not have the same sign, then torque to the front axle and the rear axle are both reduced (step 216). In one embodiment, an equal amount of torque is reduced for both the front and rear axles. In one embodiment, the amount of torque to be reduced on both axles is determined in a dynamic manner rather than a fixed calibration number. In one such embodiment, this may be determined by a look-up table or a proportional integral derivative (PID) controller based on actual slip actual angle, desired slip angle, actual yaw rate, desired yaw rate, vehicle velocity, other vehicle motion status, or the like. Also in one embodiment, the torque adjustments are made based on instructions provided by the processor 134 of FIG. 1 to the front and rear propulsion systems 106, 108 of FIG. 1.

Conversely, if it is determined in step 214 that the desired yaw rate and the actual yaw rate have the same sign, then a determination is made as to whether a difference between the absolute value of the desired yaw rate and the absolute value of the actual yaw rate is greater than or equal to a sixth predetermined threshold (step 218). In one embodiment, the predetermined threshold of step 218 is stored in the memory 136 of FIG. 1 as one of the stored values 146 thereof. In one embodiment, this threshold may be approximately equal to five degrees per second. However, this may vary in other embodiments. Also in one embodiment, the determination of step 218 is made by the processor 134 of FIG. 1.

If it is determined in step 218 that the difference between the absolute value of the desired yaw rate and the absolute value of the actual yaw rate is greater than or equal to the predetermined threshold of step 218, then torque to the front axle is reduced while torque to the rear axle is increased (step 220). In one embodiment, the torque reduction for the front axle is equal to the torque increase for the rear axle, so that the overall balance of torque (and therefore the overall propulsion) for the vehicle remains the same. For example, in one embodiment, the amount of propulsion torque will be less than the driver-requested torque, but the distribution front/rear of the propulsion torque will remain the same (thus maintaining consistency of the propulsion torque with respect to the driver requested torque). In one embodiment, the torque adjustments are made based on instructions provided by the processor 134 of FIG. 1 to the front and rear propulsion systems 106, 108 of FIG. 1.

Conversely, if it is determined in step 218 that the difference between the absolute value of the desired yaw rate and the absolute value of the actual yaw rate is less than the predetermined threshold of step 218, then a determination is made as to whether a difference between the absolute value of the actual yaw rate minus the absolute value of the desired yaw rate is greater than or equal to a seventh predetermined threshold (step 222). In one embodiment, the predetermined threshold of step 222 is stored in the memory 136 of FIG. 1 as one of the stored values 146 thereof. In one embodiment, the threshold of step 222 may be the same as the threshold of step 218. However, this may vary in other embodiments. Also in one embodiment, the determination of step 222 is made by the processor 134 of FIG. 1.

If it is determined in step 222 that the difference between the absolute value of the actual yaw rate and the absolute value of the desired yaw rate is greater than or equal to the predetermined threshold of step 222, then torque to the front axle is increased while torque to the rear axle is decreased (step 224). In one embodiment, the torque increase for the front axle is equal to the torque reduction for the rear axle, so that the overall balance of torque (and therefore the overall propulsion) for the vehicle remains the same. For example, in one embodiment, the amount of propulsion torque will be less than the driver-requested torque, but the distribution front/rear of the propulsion torque will remain the same (thus maintaining consistency of the propulsion torque with respect to the driver requested torque). In one embodiment, the torque adjustments are made based on instructions provided by the processor 134 of FIG. 1 to the front and rear propulsion systems 106, 108 of FIG. 1.

Conversely, if it is determined in step 222 that the difference between the absolute value of the desired yaw rate and the absolute value of the actual yaw rate is less than the predetermined threshold of step 222, then the process terminates (step 226).

Accordingly, the process 200 controls torque independently for the front and rear axles of the vehicle, based on vehicle parameters that include vehicle velocity, desired slip angle, actual slip angle, actual yaw rate, and desired yaw rate for the vehicle. In addition, in certain embodiments, the process 200 provides for adjustments for certain vehicle conditions (e.g. vehicle oversteer and vehicle understeer) by adjusting torque on the front and rear axles independently in a manner that maintains overall propulsion for the vehicle 100 (or more specifically, that maintains the driver intended propulsion for the vehicle, as much as possible consistent with maintaining controllability, for example as described above in connection with steps 220 and 224).

It will be appreciated that the disclosed methods, systems, and vehicles may vary from those depicted in the Figures and described herein. For example, the vehicle 100, the control system 110, and/or various components thereof may vary from that depicted in FIG. 1 and described in connection therewith. In addition, it will be appreciated that certain steps of the process 200 may vary from that depicted in FIGS. 2 and 3 and/or described above in connection therewith. It will similarly be appreciated that certain steps of the methods described above may occur simultaneously or in a different order than that depicted in FIGS. 2 and 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   obtaining data for one or more parameters of a vehicle while the vehicle is being driven, the one or more parameters comprising an actual slip angle and a desired slip angle for the vehicle, the vehicle having a front axle and a rear axle; and
   providing torque to the front axle and the rear axle independently based on the actual slip angle and the desired slip angle, wherein the step of providing torque comprises reducing torque to both the front axle and the rear axle if a rate of change of the actual slip angle is greater than a predetermined threshold and the actual slip angle is greater than the desired slip angle.

2. The method of claim 1, wherein the step of providing torque further comprises increasing the torque to one of the front axle or the rear axle and decreasing torque to the other of the front axle or the rear axle, based on the one or more parameters, while maintaining a level of overall torque for the vehicle.

3. The method of claim 1, wherein:
   the step of obtaining data further comprises obtaining data for an actual yaw rate and a desired yaw rate for the vehicle; and
   the step of providing torque further comprises providing torque to the front axle and the rear axle independently based on the actual yaw rate and the desired yaw rate.

4. The method of claim 1, wherein:
   the step of obtaining data further comprises obtaining data for an actual yaw rate and a desired yaw rate for the vehicle; and
   the step of providing torque comprises:
      reducing torque to the front axle by a first amount and reducing torque to the rear axle by a second amount that is less than the first amount if an absolute value of the desired yaw rate is greater than an absolute value of the actual yaw rate; and
      reducing torque to the front axle by a third amount and reducing torque to the rear axle by a fourth amount that is greater than the third amount if the absolute value of the actual yaw rate is greater than the absolute value of the actual yaw rate.

5. The method of claim 3, wherein:
   the step of obtaining data comprises obtaining data for an actual slip angle and a desired slip angle for the vehicle; and
   the step of providing torque comprises reducing torque to the front axle and increasing torque to the rear axle if a rate of change of the actual slip angle is less than a first predetermined threshold, a product of the desired yaw rate and the actual yaw rate is greater than or equal to zero, and a difference between an absolute value of the desired yaw rate and an absolute value of the actual yaw rate is greater than a second predetermined threshold.

6. The method of claim 3, wherein:
   the step of obtaining data comprises obtaining data for an actual slip angle and a desired slip angle for the vehicle; and
   the step of providing torque comprises increasing torque to the front axle and decreasing torque to the rear axle if a rate of change of the actual slip angle is less than a first predetermined threshold, a product of the desired yaw rate and the actual yaw rate is greater than or equal to zero, and a difference between an absolute value of the actual yaw rate and an absolute value of the actual yaw rate is greater than a second predetermined threshold.

7. The method of claim 3, wherein:
the step of obtaining data comprises obtaining data for an actual slip angle and a desired slip angle for the vehicle; and
the step of providing torque comprises decreasing torque to the front axle and decreasing torque to the rear axle if a rate of change of the actual slip angle is less than a first predetermined threshold and a product of the desired yaw rate and the actual yaw rate is less than zero.

8. A system comprising:
a data unit configured to obtain data for one or more parameters of a vehicle while the vehicle is being driven, the one or more parameters comprising an actual slip angle and a desired slip angle for the vehicle, the vehicle having a front axle and a rear axle; and
a processor coupled to the data unit and configured to at least facilitate reducing torque to both the front axle and the rear axle if a rate of change of the actual slip angle is greater than a predetermined threshold and the actual slip angle is greater than the desired slip angle.

9. The system of claim 8, wherein the processor is configured to at least facilitate:
increasing the torque to one of the front axle or the rear axle and decreasing torque to the other of the front axle or the rear axle, based on the one or more parameters, while maintaining a consistency between overall torque and a driver requested torque for the vehicle.

10. The system of claim 8, wherein:
the data unit is configured to obtain a velocity of the vehicle; and
the processor is configured to at least facilitate providing torque to the front axle and the rear axle independently based on the one or more parameters, provided that the velocity is less than a predetermined threshold.

11. The system of claim 8, wherein:
the data unit is configured to obtain data for an actual yaw rate and a desired yaw rate for the vehicle; and
the processor is configured to at least facilitate providing torque to the front axle and the rear axle independently based on the actual yaw rate and the desired yaw rate.

12. The system of claim 8, wherein:
the data unit is configured to obtain data for an actual yaw rate and a desired yaw rate for the vehicle; and
the processor is configured to at least facilitate:
reducing torque to the front axle by a first amount and reducing torque to the rear axle by a second amount that is less than the first amount if an absolute value of the desired yaw rate is greater than an absolute value of the actual yaw rate; and
reducing torque to the front axle by a third amount and reducing torque to the rear axle by a fourth amount that is greater than the third amount if the absolute value of the actual yaw rate is greater than the absolute value of the actual yaw rate.

13. The system of claim 11, wherein:
the data unit is configured to obtain data for an actual slip angle and a desired slip angle for the vehicle; and
the processor is configured to at least facilitate reducing torque to the front axle and increasing torque to the rear axle if a rate of change of the actual slip angle is less than a first predetermined threshold, a product of the desired yaw rate and the actual yaw rate is greater than or equal to zero, and a difference between an absolute value of the desired yaw rate and an absolute value of the actual yaw rate is greater than a second predetermined threshold.

14. The system of claim 11, wherein:
the data unit is configured to obtain data for an actual slip angle and a desired slip angle for the vehicle; and
the processor is configured to at least facilitate increasing torque to the front axle and decreasing torque to the rear axle if a rate of change of the actual slip angle is less than a first predetermined threshold, a product of the desired yaw rate and the actual yaw rate is greater than or equal to zero, and a difference between an absolute value of the actual yaw rate and an absolute value of the actual yaw rate is greater than a second predetermined threshold.

15. The system of claim 11, wherein:
the data unit is configured to obtain data for an actual slip angle and a desired slip angle for the vehicle; and
the processor is configured to at least facilitate decreasing torque to the front axle and decreasing torque to the rear axle if a rate of change of the actual slip angle is less than a predetermined threshold and a product of the desired yaw rate and the actual yaw rate is less than zero.

16. A vehicle comprising:
a body;
a front axle disposed within the body;
a rear axle disposed within the body;
a data unit configured to obtain data for one or more vehicle parameters while the vehicle is being driven, the one or more parameters comprising an actual slip angle and a desired slip angle for the vehicle; and
a processor disposed within the body and coupled to the data unit, the processor configured to at least facilitate reducing torque to both the front axle and the rear axle if a rate of change of the actual slip angle is greater than a predetermined threshold and the actual slip angle is greater than the desired slip angle.

\* \* \* \* \*